US007881059B2

(12) United States Patent
Hosking

(10) Patent No.: US 7,881,059 B2
(45) Date of Patent: Feb. 1, 2011

(54) HEAT MANAGEMENT IN AN ELECTRONIC MODULE

(75) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 12/351,542

(22) Filed: Jan. 9, 2009

(65) Prior Publication Data

US 2009/0190310 A1 Jul. 30, 2009

(51) Int. Cl.
*H05K 7/20* (2006.01)
(52) U.S. Cl. ............... 361/700; 361/699; 361/719; 165/80.4; 165/104.33; 174/15.1; 174/15.2
(58) Field of Classification Search ............... None
See application file for complete search history.

(56) References Cited

U.S. PATENT DOCUMENTS

| | | | | |
|---|---|---|---|---|
| 6,082,443 A * | 7/2000 | Yamamoto et al. | ...... | 165/104.26 |
| 6,418,017 B1 * | 7/2002 | Patel et al. | ...... | 361/700 |
| 6,588,647 B2 * | 7/2003 | Yamada et al. | ...... | 228/112.1 |
| 6,981,805 B2 * | 1/2006 | Miller et al. | ...... | 385/92 |
| 7,295,433 B2 * | 11/2007 | Taylor et al. | ...... | 361/689 |
| 7,310,233 B2 * | 12/2007 | Bell | ...... | 361/704 |
| 7,397,668 B2 * | 7/2008 | Sekine et al. | ...... | 361/732 |
| 7,504,720 B2 * | 3/2009 | Nakatsu et al. | ...... | 257/712 |
| 2007/0240860 A1 | 10/2007 | Meyer, IV et al. | | |
| 2007/0295494 A1 | 12/2007 | Mayer et al. | | |
| 2008/0210407 A1 | 9/2008 | Kim et al. | | |
| 2009/0225512 A1 * | 9/2009 | Visser | ...... | 361/699 |

OTHER PUBLICATIONS

Celsia Technologies, Technology Resource Center, Nanospreader Technology, obtained Dec. 31, 2007, two pages, available at: http://www.celsiatechnologies.com/nanospreader_technology.asp.
Celsia Technologies, Product Fact Sheet, Celsia NanoSpreader Technology, Apr. 2006, two pages, Celsia Technologies, Inc., Miami, Florida.
Celsia Technologies, Technology Resource Center, How It Works, obtained Aug. 8, 2007, two pages, available at: Celsia_Technologies_productdata/Celsia_howitworks.htm.
Celsia Technologies, Products, Performance Metrics, obtained Aug. 8, 2007, four pages, available at: Celsia_Technologies_productdata/Celsia_PerformanceMetrics.htm.

* cited by examiner

*Primary Examiner*—Boris L Chervinsky
(74) *Attorney, Agent, or Firm*—Workman Nydegger

(57) ABSTRACT

In one example, an electronic module includes a printed circuit board and a housing at least partially enclosing the printed circuit board. The printed circuit board includes a heat-generating component. The housing includes a first case and a second case attached to the first case. The first and second cases cooperatively define a sealed cavity containing a fluid. The second case includes a thermal contact structure positioned proximate to the heat-generating component.

20 Claims, 5 Drawing Sheets

HEAT MANAGEMENT IN AN ELECTRONIC MODULE

CROSS REFERENCE TO A RELATED APPLICATION

This application claims the benefit of U.S. Provisional Application No. No. 61/024,480, titled "HEAT MANAGEMENT IN AN ELECTRONIC MODULE" filed Jan. 29, 2008, which is incorporated herein by reference in its entirety.

BACKGROUND

Electronic modules, such as electronic or optoelectronic transceiver or transponder modules, are increasingly used in electronic and optoelectronic communication. Modules typically communicate with a printed circuit board of a host device by transmitting electrical signals to the printed circuit board and receiving electrical signals from the printed circuit board. These electrical signals can then be transmitted by the module outside the host device as optical and/or electrical signals.

One common difficulty associated with modules is the generation of heat during the operation of the modules. This generated heat, if not dissipated, can cause a module to malfunction or to become damaged. Some heat-generating components within a module include a flat surface that is generally parallel to a surface of the module housing, although the elevations and locations of these component surfaces may vary by component type due to the different sizes of the different components. The elevations of the surfaces of these components may also vary slightly due to assembly tolerances, such as soldering tolerances.

Typical modules include a die cast zinc module housing with heat-removal features resembling pedestals or recesses molded on the inside of the housing to provide thermal contact to the various heat-generating components within the module housing. Due to manufacturing tolerances, there is generally a small gap between each pedestal or recess in the module housing and the corresponding heat-generating component because the housing and the component are both relatively rigid and must not be allowed to interfere with each other. These gaps may be filled with a relatively thick amount of thermal gap-filler material that is thermally conductive but pliable. The thermal conductivity of the zinc used in a typical module housing is relatively low, as is the thermal conductivity of typical thermal gap-filler material. Typical thermal gap-filler material may also be messy, difficult to manufacture, and intolerant of disassembly.

SUMMARY OF SOME EXAMPLE EMBODIMENTS

In general, example embodiments of the present invention relate to managing heat in electronic modules. Some example embodiments are electronic modules having a housing configured for operation as a heat transfer device (a "heat transfer housing"). Some example heat-transfer housings disclosed herein allow for direct mechanical contact with controlled contact pressure to heat-generating components within the housing, thus reducing or eliminating the need for thermal gap-filler material in the assembly of the module. Some example heat-transfer housings disclosed herein may also result in the thermal gradients from one part of the module to another part of the module being significantly reduced.

In one example embodiment, an electronic module includes a printed circuit board and a housing at least partially enclosing the printed circuit board. The printed circuit board includes a heat-generating component. The housing includes a first case and a second case attached to the first case. The first and second cases cooperatively define a sealed cavity containing a fluid. The second case includes a thermal contact structure positioned proximate to the heat-generating component.

In another example embodiment, an electronic module includes a printed circuit board and a housing at least partially enclosing the printed circuit board. The printed circuit board includes a heat-generating component. The housing includes a first sheet metal case and a second sheet metal case attached to the first sheet metal case. The first and second sheet metal cases cooperatively define a sealed cavity containing a fluid. The second sheet metal case includes a thermal contact structure sized and positioned to mechanically contact the heat-generating component.

In yet another example embodiment, an electronic module includes a printed circuit board and a housing at least partially enclosing the printed circuit board. The printed circuit board includes a heat-generating component. The housing includes a first case and a second case attached to the first case. The first and second cases cooperatively define a sealed cavity containing a fluid. The second case includes a thermal contact structure sized and positioned to mechanically contact the heat-generating component. The electronic module is substantially free of thermal gap-filler material between the heat-generating component and the thermal contact structure.

BRIEF DESCRIPTION OF THE DRAWINGS

To further clarify certain aspects of example embodiments of the invention, a more particular description of the invention will be rendered by reference to example embodiments thereof which are disclosed in the appended drawings. It is appreciated that these drawings depict only example embodiments of the invention and are therefore not to be considered limiting of its scope nor are they necessarily drawn to scale. Aspects of example embodiments of the invention will be described and explained with additional specificity and detail through the use of the accompanying drawings in which.

DETAILED DESCRIPTION OF EXAMPLE EMBODIMENTS

Example embodiments of the present invention relate to managing heat in electronic modules. Some example embodiments are electronic modules having a housing configured for operation as a heat transfer device (a "heat-transfer housing"). Some example heat-transfer housings disclosed herein allow for direct mechanical contact with controlled contact pressure to heat-generating components within the housing, thus reducing or eliminating the need for thermal gap-filler material in the assembly of the module. Some example heat-transfer housings disclosed herein may also result in the thermal gradients from one part of the module to another part of the module being significantly reduced.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1A:
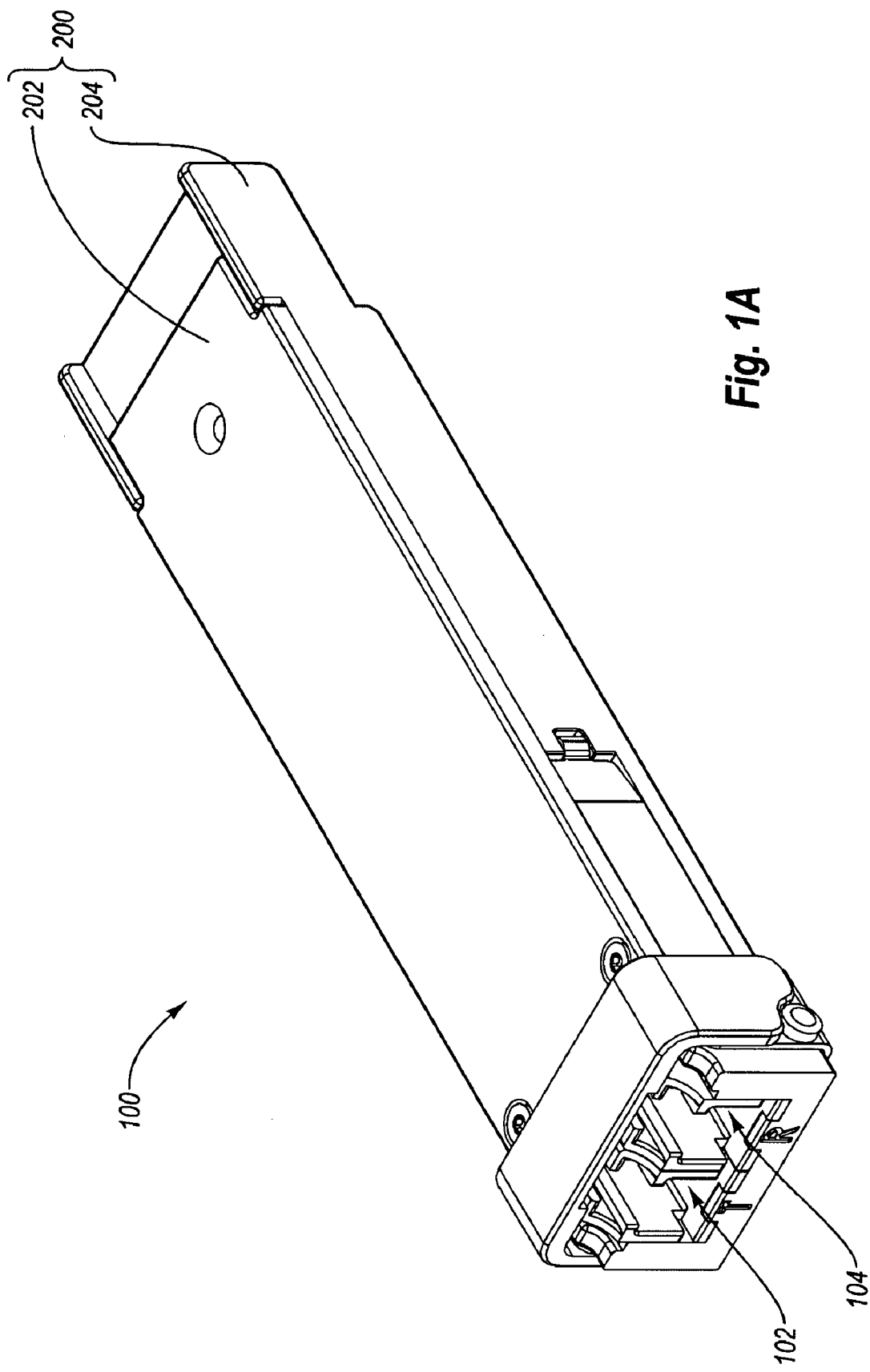
FIG. 1A is a top perspective view of an example electronic module having an example heat-transfer housing.
Figure 1B:
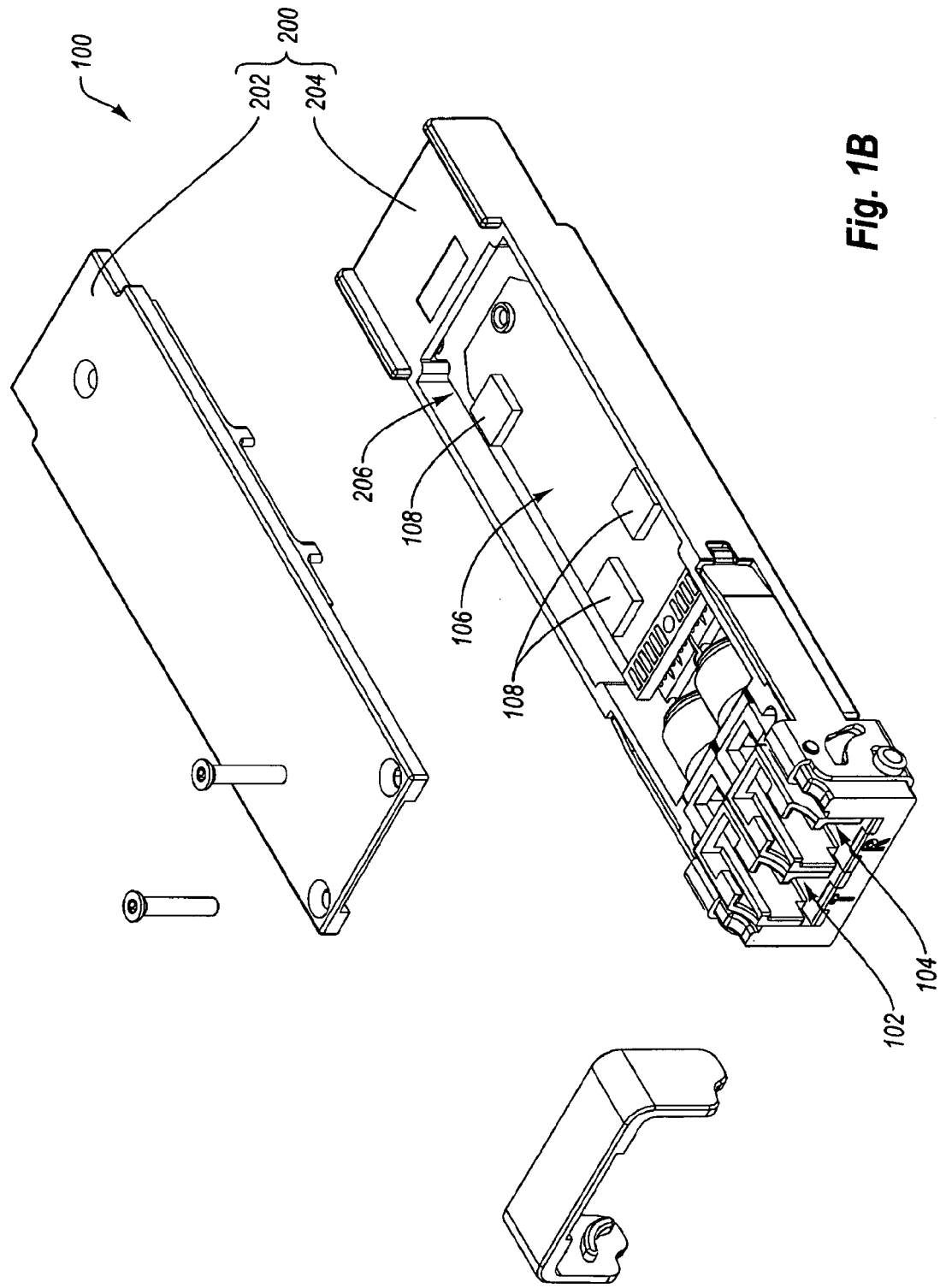
FIG. 1B is a top exploded perspective view of the example electronic module of FIG. 1A.
Figure 1C:
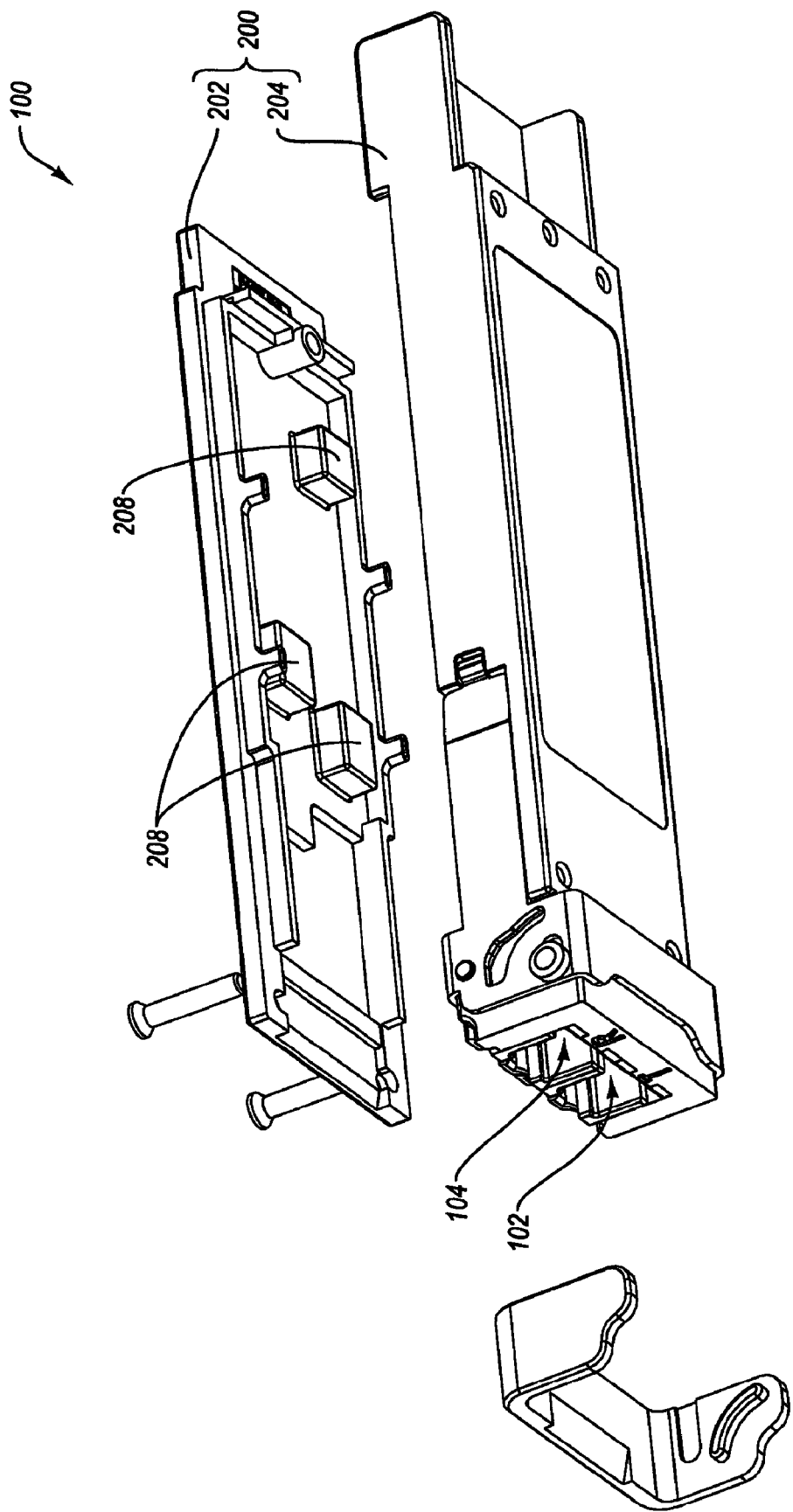
FIG. 1C is a bottom exploded perspective view of the example electronic module of FIG. 1A.

Reference is first made to FIGS. 1A-1C, which disclose an example optoelectronic module 100 for use in transmitting and receiving optical signals in connection with a host device (not shown). As disclosed in FIGS. 1A-1C, the module 100 includes various components, including a housing 200 made up of a top housing 202 and a bottom housing 204, a transmit port 102 and a receive port 104 defined in the bottom housing 204, and a printed circuit board (PCB) 106 including a variety of heat-generating components 108 positioned within the housing 200. Heat-generating components 108 may be, but are not limited to, processors, laser drivers, thermoelectric coolers (TECs), post amplifiers, various other types of electronic circuitry, transmitter optical subassemblies (TOSAs), and receiver optical subassemblies (ROSAs). It is noted that the various embodiments of heat-transfer housing disclosed herein may be employed to dissipate heat from heat-generating components that are not included on the PCB 106, but are instead positioned in/on other components within the module 100.

The module 100 can be configured for optical signal transmission and reception at a variety of data rates including, but not limited to, 1 Gb/s, 2 Gb/s, 2.5 Gb/s, 4 Gb/s, 8 Gb/s, 10 Gb/s, or higher. Further, the module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Also, the module 100 can be configured to support various communication protocols including, but not limited to, Fast Ethernet, Gigabit Ethernet, 10 Gigabit Ethernet, and 1×, 2×, 4×, and 10× Fibre Channel.

In addition, although one example of the module 100 is configured to have a form factor that is substantially compliant with the 10 Gb/s Small Form Factor Pluggable ("XFP") Multi-Source Agreement ("MSA"), the module 100 can alternatively be configured in a variety of different form factors that are substantially compliant with other MSAs including, but not limited to, the SFF MSA, the SFP MSA, or the SFP+ (IPF) MSA. Finally, although the module 100 is an optoelectronic transceiver module, example embodiments of the present invention can alternatively be implemented in optoelectronic transponder modules, electronic transceiver modules, or electronic transponder modules. It is noted that embodiments of the present invention may be particularly useful in modules that employ dense wave division multiplexing (DWDM), as the heat-generating components of these modules generate a relatively high amount of heat.

As disclosed in FIG. 1B, the bottom housing 204 generally defines a receptacle 206 in which the PCB 106 is positioned. As disclosed in FIG. 1C, the top housing 202 of the example housing 200 generally includes a plurality of thermal contact structures 208. Each of the thermal contact structures 208, disclosed in FIG. 1C, corresponds to one of the heat-generating components 108 of the PCB 106, disclosed in FIG. 1B.

Figure 2:
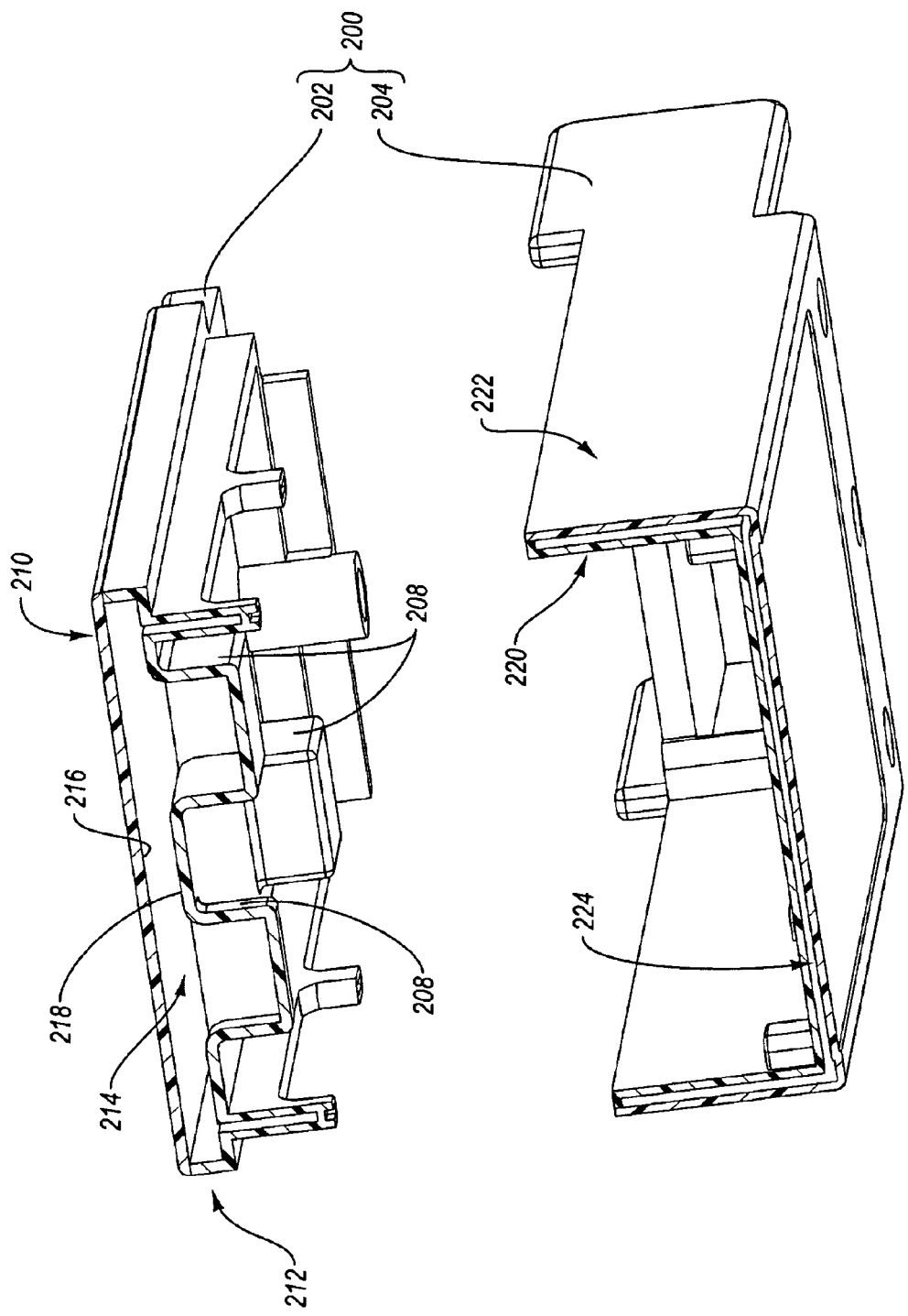
FIG. 2 is a bottom exploded cross-sectional perspective view of a portion of the example heat-transfer housing of FIGS. 1A-1C.
Figure 3:
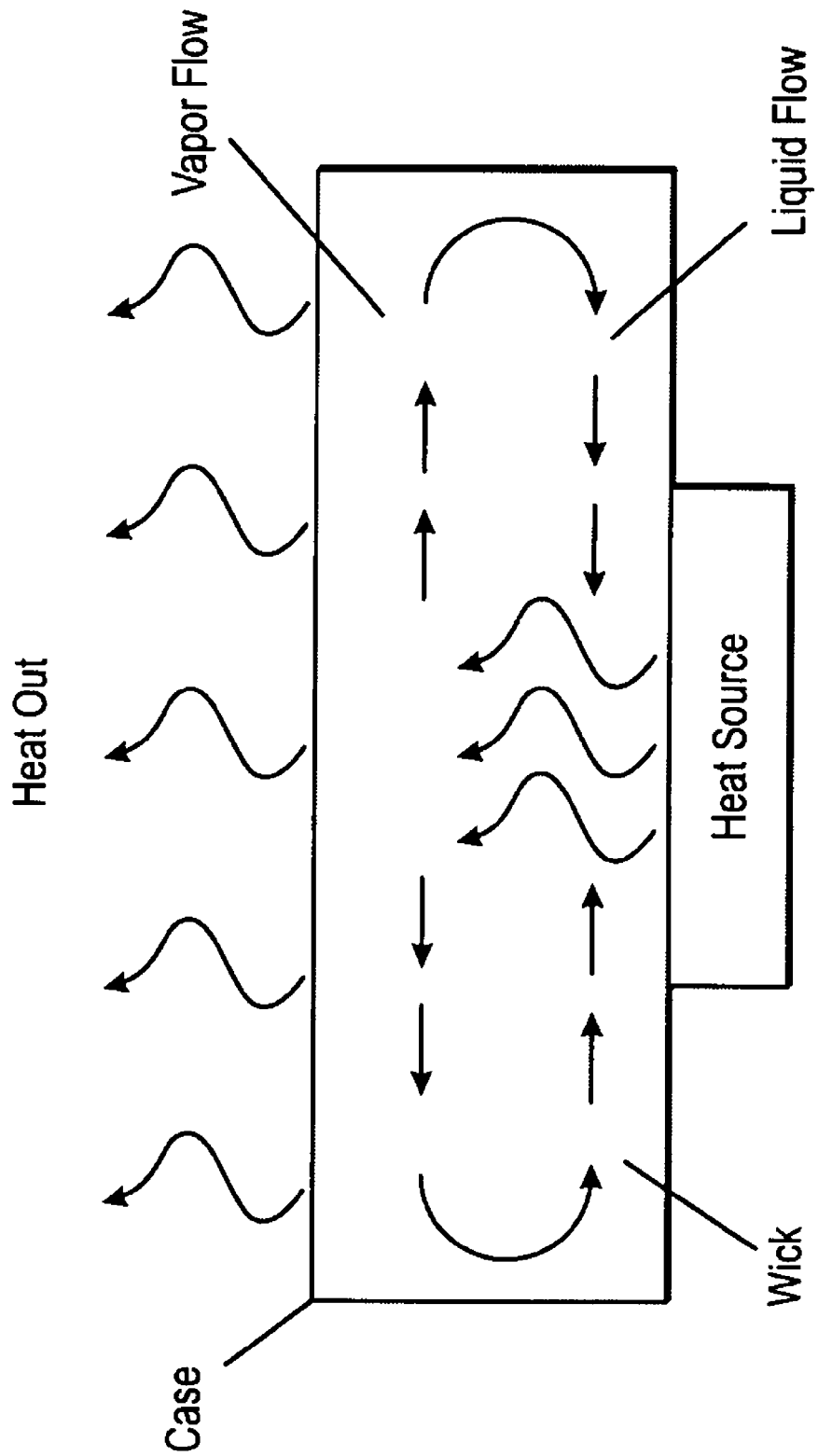
FIG. 3 is a schematic diagram of heat management in an example electronic module.

With reference now to FIG. 2, the top housing 202 is generally configured for operation as a heat transfer device, although it is understood that other portions of the housing 200, such as the bottom housing 204, may also or alternatively be configured for operation as a heat transfer device. In general, as disclosed in FIG. 3, a heat transfer device is a structure where a fluid with desirable liquid/vapor state characteristics is trapped within the structure and the shape of the structure is arranged so that heat in a hotter region of the structure is rapidly transported to a cooler region of the structure by way of the evaporation (boiling) of the fluid in the hotter region of the structure and subsequent condensation of the fluid at the cooler region of the structure. The physical circulation of the fluid within the structure and the use of the liquid/vapor state change generally transports the heat more effectively than conduction through a solid material.

In some example embodiments, the top housing 202 of FIG. 2 and/or other portion of the housing 200 and module 100 may be constructed as one or more heat transferring devices disclosed in United States Patent Application Publication Number 2007/0295494 A1 or one or more heat transferring devices disclosed in United States Patent Application Publication Number 2008/0210407 A1, the disclosures of which are incorporated herein by reference in their entireties. Each of the heat transferring devices disclosed in these patent application publications includes one or more wick structures positioned within a sealed cavity of the heat transferring device.

With continuing reference to FIG. 2, the top housing 202 generally includes a first case 210 and a second case 212. Each of the first and second cases 210 and 212 can be formed using one or more metal stamping processes. For example, the first and second cases 210 and 212 may be formed using a coin press that may require more than one press operation to achieve the final shape. A "coin press" refers to a press operation where the press can bend or shear metal as well as plastically deform metal to the exact shape of the die. Employing a coin press allows both fine detail and high precision. The first and second cases 210 and 212 may be formed from one of a variety of different sheet metals or composites, such as copper or a copper alloy.

In some example embodiments, the first case 210 may be stamped from a relatively thicker metal than the second case 212. Alternatively, the thicknesses of the first and second cases 210 and 212 may be substantially equal. For example, each of the first and second cases 210 and 212 may be formed as relatively thin sheet metal stampings having thicknesses of about 1 mm. Further, the first case 210 may alternatively be stamped from a relatively thinner metal than the second case 212.

The top housing 202 can generally be assembled by sealing the edges of the first and second cases 210 and 212 together. This seal may be accomplished using a variety of processes including, but not limited to, laser welding, friction welding, pressure welding, crimping, brazing, soldering, or some combination thereof. In addition, the seal may be created in a fashion that creates a vacuum seal.

As disclosed in FIG. 2, once assembled, the first and second cases 210 and 212 of the top housing 202 define a cavity 214. The cavity 214 can be formed by leaving a controlled gap between the first and second cases 210 and 212 when the cases 210 and 212 are sealed together around their edges. In order to allow the top housing 202 to function as a heat transfer device, before being sealed the cavity 214 is filled with an appropriate quantity and type of heat transfer fluid. Examples of heat transfer fluids include, but are not limited to, distilled water, Freon, alcohol, butane, liquid metals such as mercury, dielectric coolants, or some combination thereof.

During operation, a heat transfer device generally includes a relatively cooler region and a relatively hotter region. The first case 210 generally serves as an outside surface of the module 100 and is generally the relatively cooler side of the top housing 202. The second case 212 serves as an inside surface of the module 100 (see FIGS. 1B and 1C) and is the relatively hotter side of the top housing 202, due largely to the relatively close proximity of the heat-generating components 108 to the second case 212 (see FIG. 1B).

With continuing reference to FIG. 2, an inside surface 216 of the first case 210 and/or an inside surface 218 of the second case 212 may contain features, such as grooves or bumps (not shown), to give mechanical strength to support the first case 210 and/or the second case 212, to control the spacing between the first and second cases 210 and 212, to enhance heat transfer from the heat-generating components 108 to the coolant fluid contained in the cavity 214, and/or to help direct the flow of the coolant fluid contained in the cavity 214.

As disclosed elsewhere herein, the second case 212 also includes the thermal contact structures 208 to make thermal contact with heat-generating components 108 of the PCB 106 within the module 100 (see FIG. 1B). This thermal contact may be achieved by designing and constructing each of the thermal contact structures 208 of the second case 212 so as to be proximate to the corresponding heat-generating component 108 (see FIG. 1B). Where each of the thermal contact structures 208 are proximate to the corresponding heat-generating component 108, but not quite in mechanical contact with the thermal contact structures 208, a thermal gap-filler material, such as alumina laden paste, may be positioned between each of the thermal contact structures 208 and the corresponding heat-generating component 108.

The above-noted thermal contact may further be achieved by designing and constructing each of the thermal contact structures 208 of the second case 212 so as to provide mechanical compliance, which is a predetermined level of flexibility or springiness, to allow direct mechanical contact with controlled contact pressure to the corresponding heat-generating component 108 (see FIG. 1B). This compliance automatically allows for, and aligns to, the manufacturing and assembly tolerances of the heat-generating components 108, and may even conform to surface irregularities of the heat-generating components 108. This compliance may compensate for both assembly height tolerances and assembly planarity tolerances of the heat-generating components 108. It is noted that due to differences in height and assembly tolerances between the various heat-generating components 108, the thermal contact structures 208 may have differing heights.

This compliance of the thermal contact structures 208 may also enable the thermal contact structures 208 to conform to the heat-generating components 108 and cool the heat-generating components 108 with controlled contact pressure. For example, where the thermal contact structures 208 are formed from various types of sheet metal, such as copper sheet metal, the thermal contact structures 208 can conform, either during assembly or during operation, to the heat-generating components 108 and cool the heat-generating components 108, during operation, with controlled contact pressure. It is noted that the ability of the thermal contact structures 208 to conform to the heat-generating components 108 may be enhanced during operation due to the heating and softening of the material from which the thermal contact structures 208 is formed.

The ability of the thermal contact structures 208 to conform to the heat-generating components 108 with controlled contact pressure may reduce or eliminate the need for thermal gap-filler material between the thermal contact structures 208 and the heat-generating components 108. This compliance may therefore reduce the thermal resistance between the heat-generating components 108 and the first case 210 of the top housing 202.

As disclosed in FIG. 2, the bottom housing 204 may also be configured for operation as a heat transfer device. For example, the bottom housing 204 may include a third case 220 and a fourth case 222 which together define one or more cavities 224. The third and fourth cases 220 and 222 and the cavity 224 may be sized, configured, and function similarly to the first and second cases 210 and 212 and the cavity 214, respectively. As disclosed in FIGS. 1A, 1B, and 2 the cavities 214 and 224 cooperate to radially surround about 360 degrees of at least a portion of the PCB 106. Alternatively, the sides of the bottom housing 204 may be included as part of the top housing 202 instead of being included as part of the bottom housing 204. In other example embodiments, the top housing 202 and the bottom housing 204 may be integrally formed as a single housing.

Although the thermal contact structures 208 are formed in the surface of the second case 212 in FIGS. 1C and 2, it is understood that similar thermal contact structures can alternatively/additionally be formed in other surfaces of the housing 200. For example, similar thermal contact structures can be formed in the case 210, the case 220, and/or the case 222, depending on the location of heat-generating components within or without the housing 200. These other thermal contact structures may have the same characteristics as the thermal contact structure 208.

The top heat-transfer housing 202 disclosed herein therefore allows for direct mechanical contact with controlled contact pressure to heat-generating components 108 of the PCB 106, thus reducing or eliminating the need for thermal gap-filler material in the assembly of the module 100. Use of the top heat-transfer housing 202 disclosed herein may also result in the thermal gradients from one part of the module 100 to another being significantly reduced.

In some example embodiments, one or more heat transferring devices, such as the heat transferring devices disclosed in the patent application publications that are incorporated herein by reference, may be strategically placed in and/or on the module 100 instead of, or in addition to, constructing one or more portions of the housing 200 as a heat transferring device.

The example embodiments disclosed herein may be embodied in other specific forms. The example embodiments disclosed herein are to be considered in all respects only as illustrative and not restrictive.

What is claimed is:

1. An electronic module comprising:
    a printed circuit board, the printed circuit board comprising a heat-generating component; and
    a housing at least partially enclosing the printed circuit board, the housing comprising:
        a first case;
        a second case attached to the first case, the first and second cases cooperatively defining a sealed cavity containing a fluid, the second case comprising a thermal contact structure positioned proximate to the heat-generating component;
        a third sheet metal case; and
        a fourth sheet metal case attached to the third sheet metal case, the third and fourth sheet metal cases cooperatively defining a second sealed cavity containing a second fluid, the first and second sealed cavities cooperating to radially surround about 360 degrees of at least a portion of the printed circuit board.

2. The electronic module as recited in claim 1, further comprising one or more wick structures positioned within the sealed cavity.

3. The electronic module as recited in claim 1, further comprising thermal gap-filler material positioned between the thermal contact structure and the heat-generating component.

4. The electronic module as recited in claim 1, wherein the second case comprises coin-pressed sheet metal.

5. The electronic module as recited in claim 1, wherein the second case comprises sheet metal having a thickness of about 1 mm.

6. The electronic module as recited in claim 1, wherein:
the electronic module is configured to transmit and receive data signals; and
the housing defines a transmit port and a receive port through which the data signals can be transmitted and received, respectively.

7. The electronic module as recited in claim 1, wherein:
the first case comprises sheet metal; and
the second case comprises sheet metal,
wherein the sheet metal of the first case is thinner than the sheet metal of the second case.

8. An electronic module comprising:
a printed circuit board, the printed circuit board comprising a heat-generating component; and
a housing at least partially enclosing the printed circuit board, the housing comprising:
a first sheet metal case;
a second sheet metal case attached to the first sheet metal case, the first and second sheet metal cases cooperatively defining a sealed cavity containing a fluid, the second sheet metal case comprising a thermal contact structure sized and positioned to mechanically contact the heat-generating component
a third sheet metal case; and
a fourth sheet metal case attached to the third sheet metal case, the third and fourth sheet metal cases cooperatively defining a second sealed cavity containing a second fluid, the first and second sealed cavities cooperating to radially surround about 360 degrees of at least a portion of the printed circuit board.

9. The electronic module as recited in claim 8, further comprising one or more wick structures positioned within the sealed cavity.

10. The electronic module as recited in claim 8, wherein the fluid comprises distilled water, Freon, alcohol, or butane.

11. The electronic module as recited in claim 8, wherein the second case comprises coin-pressed sheet metal.

12. The electronic module as recited in claim 8, wherein:
the electronic module is configured to transmit and receive optical signals; and
the housing defines a transmit port and a receive port through which the optical signals can be transmitted and received, respectively.

13. The electronic module as recited in claim 8, wherein the fourth case comprises a thermal contact structure sized and positioned to mechanically contact a second heat-generating component.

14. An electronic module comprising:
a printed circuit board, the printed circuit board comprising a heat-generating component; and
a housing at least partially enclosing the printed circuit board, the housing comprising:
a first case;
a second case attached to the first case, the first and second cases cooperatively defining a sealed cavity containing a fluid, the second case comprising a thermal contact structure sized and positioned to mechanically contact the heat-generating component;
a third case; and
a fourth case attached to the third sheet metal case, the third and fourth cases cooperatively defining a second sealed cavity containing a second fluid, the first and second sealed cavities cooperating to radially surround about 360degrees of at least a portion of the printed circuit board,
wherein the electronic module is substantially free of thermal gap-filler material between the heat-generating component and the thermal contact structure.

15. The electronic module as recited in claim 14, further comprising one or more wick structures positioned within the sealed cavity.

16. The electronic module as recited in claim 14, wherein the second case comprises coin-pressed sheet metal.

17. The electronic module as recited in claim 14, further comprising:
a transmitter optical subassembly at least partially positioned within the housing, and
a receiver optical subassembly at least partially positioned within the housing.

18. The electronic module as recited in claim 14, wherein the fluid comprises distilled water, Freon, alcohol, or butane.

19. The electronic module as recited in claim 14, wherein the sealed cavity is vacuum sealed.

20. The electronic module as recited in claim 14, wherein an inside surface of the second case and an inside surface of the fourth case includes grooves or bumps.

* * * * *